Figure 1:
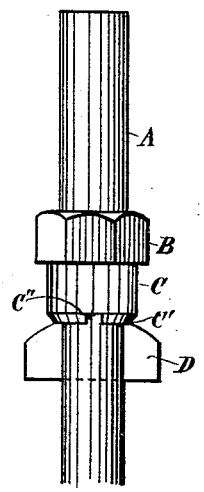

(No Model.)

W. BRAMWELL & W. N. BOYLE.
BORING BAR.

No. 389,360. Patented Sept. 11, 1888.

Witnesses.
Carroll J. Webster.
James Rayny

Inventors.
William Bramwell,
William N. Boyle.
By William Webster.
Attorney.

UNITED STATES PATENT OFFICE.

WILLIAM BRAMWELL AND WILLIAM N. BOYLE, OF TOLEDO, OHIO.

BORING-BAR.

SPECIFICATION forming part of Letters Patent No. 389,360, dated September 11, 1888.

Application filed April 9, 1888. Serial No. 270,037. (No model.)

*To all whom it may concern:*

Be it known that we, WILLIAM BRAMWELL and WILLIAM N. BOYLE, citizens of the United States, residing at Toledo, in the county of Lucas and State of Ohio, have invented certain new and useful Improvements in a Boring-Bar with Self-Adjusting and Interchangeable Cutters; and we do hereby declare that the following is a full, clear, and exact description of the invention, which will enable others skilled in the art to which it appertains to make and use the same, reference being had to the accompanying drawings, and to the letters of reference marked thereon, which form part of this specification.

Our invention relates to a boring-bar with self-adjusting and interchangeable cutters, and has for its object to construct a boring-bar for the reception of cutters that shall be capable of receiving and securing in place cutters of different sizes, thereby rendering them interchangeable.

Another object is to dispense with the usual key and cutter necessarily used in the ordinary boring-bar, and to substitute therefor an arrangement upon the bar that shall be easily adjusted to the different sizes of cutters and that will not be liable to be displaced or lost.

Another object is to provide a compress-ring and cutter that shall coact to automatically adjust the cutter to the axis of the cutter-bar.

Another object is to construct a cutter with the maximum strength at the cutting-edge, thereby giving the full strength of the metal at the point of greatest strain.

In the branch of the art to which our invention belongs it has been usual to construct the cutter with a central portion to rest upon the boring-bar and with depending cutting-edges extending radially therefrom to the required diameter, the cutter being secured within the bar by a cotter and key, or, in some instances, by a set-screw. The objections to this arrangement are that the cutter is the weakest at the point of greatest strain, (that being the depending cutting-edges,) and also that the key and set-screw are liable to work loose, and, further, there is no interchangeability of cutters, thereby requiring a separate bar for each size of cutter. A further objection is that it requires the most delicate adjustment of the cutters to secure the desired radius from the axis of the boring-bar, it being necessary that the cutter be exactly centered in the bar to secure a cut of bore just equal to the length of cutter. These objections are entirely overcome by the construction illustrated in the drawings, in which—

Figure 2:
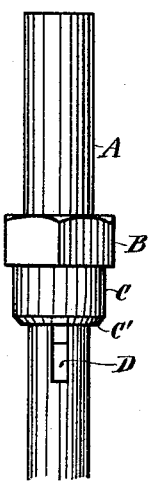
Figure 3:
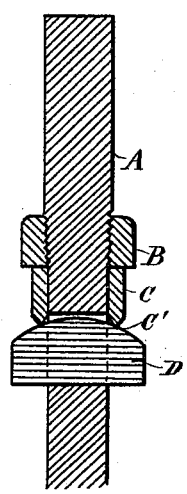
Figure 4:
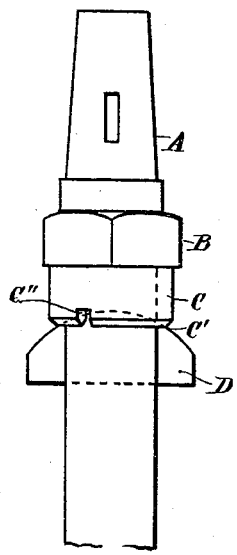
Figure 5:
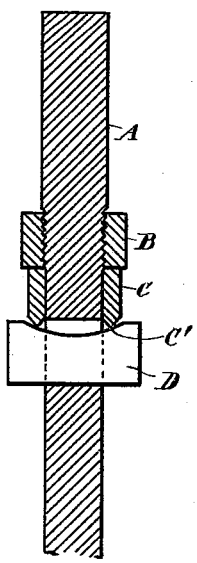

Figure 1 is a front elevation of a boring-bar with cutter in place. Fig. 2 is a side elevation of the bar with the cutter removed. Fig. 3 is a vertical longitudinal sectional view of the boring-bar and cutter in place. Fig. 4 is a front elevation of the bar with cutter in place, the upper portion of the bar being formed to fit a drill-press spindle. Fig. 5 is a vertical longitudinal sectional view of the boring-bar with a modified form of cutter secured therein.

A designates the boring-bar, which may be formed at the upper end to fit any desired chuck, and extends below the cutter in the usual manner.

D designates a rectangular slot in the bar of a form to allow the insertion and removal of the cutters.

C is a ring placed upon the bar between the slot and a nut, B, running upon a thread upon the bar. Ring C is formed with a square upper edge, against which the nut bears, and a lower annular portion beveled to form a knife-edge bearing, C', adapted to bear upon the upper edge of the cutter, the bearing C' having square-cut grooves C'', at diametrically-opposite points, of a size corresponding to the thickness of the cutters.

D' is a cutter, formed with a straight lower edge and an upper edge either concave, as shown in Figs. 1, 3, and 4, or convex, as shown in Fig. 5, and is inserted into the rectangular slot D and adjusted to cut on a true circle from the axis of the bar. In the ordinary construction this adjustment is provided for by removing from the cutting-edge of the cutter a rectangular portion centrally thereof corresponding in width to the diameter of the bar and having depending cutting portions, the upper edge of the cutter having a plain horizontal surface, the cutter being held in place by a key or set-screw. The objections to this arrangement are that the cutter is not interchangeable with bars of varying diameters, and also that the cutter is greatly weakened by the removal of the central portion and causes the cutting-edges to break.

In the construction herein shown the cutter is of greatly-increased strength by reason of the cutting-edges being on a plane with the lower edge of the cutter, and by reason of the concave or convex upper edge and the force of the annular ring the cutter is centered in the act of being secured, the form of cutter also allowing an interchangeability from one bar to another of less or greater diamter.

In operation the cutter is inserted in the perforation, the beveled edge of the annular ring bearing upon the concave or convex upper edge thereof. Compression-nut B is tightened upon the annular ring, and the pressure of the same upon the cutter centers the same with relation to the axis of the bar, as should the cutter protrude too far through one side of perforation D the pressure upon that side by the annular ring will move the cutter until both sides are impinged, thereby rendering this adjustment automatic.

When it is desired to remove the cutter, the nut is loosened sufficiently to allow the annular ring to be turned so that grooves C" coincide with the upper edge of the cutter, when the cutter may be withdrawn. With this arrangement any number of different-sized cutters may be used in the same bar, thereby obviating the necessity of different sets of cutters for bars of different diameters. If desired, the ring may be threaded and the nut dispensed with.

What we claim, and desire to secure by Letters Patent, is—

1. In combination with a boring-bar, a cutter formed with a straight lower edge and an inclined upper edge, and a ring held in engagement with the upper edge of the cutter by a nut upon the bar, as and for the purpose set forth.

2. In combination with a boring-bar, a cutter with inclined upper edge and a ring provided with a beveled bearing-surface resting upon the cutter and held in frictional engagement by a nut upon the bar, as and for the purpose set forth.

In testimony that we claim the foregoing as our own we hereby affix our signatures in presence of two witnesses.

WILLIAM BRAMWELL.
WILLIAM N. BOYLE.

Witnesses:
WILLIAM WEBSTER,
CARROLL J. WEBSTER.